Patented July 13, 1937

2,086,777

UNITED STATES PATENT OFFICE 2,086,777

PROCESS FOR SEPARATING PINE GUM INTO FRACTIONS

Samuel Palkin and Thomas H. Harris, Jr., Washington, D. C., dedicated to the free use of the public No Drawing. Application July 5, 1934, Serial No. 733,866

2 Claims. (Cl. 87—2)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to us of any royalty thereon.

We hereby dedicate the invention herein described to the free use of the public, to take effect upon the granting of a patent to us.

Turpentine gum on standing tends to separate into two layers, an upper oily viscous layer and a lower layer consisting of a crystalline mass (termed by the French "galipot") thoroughly impregnated with the viscous gum-liquid.

The pine gum as a whole may be considered a saturated or super-saturated solution of complex resin acids, "resenes" and of other naturally occurring solid bodies in a volatile oil consisting of terpenes (almost wholly alpha and beta pinene). The gum also contains more or less foreign matter such as chips, bark, finely suspended dirt, water, etc., which find their way into the gum during the process of collecting.

In the usual commercial process of steam distillation, the volatile oils are separated in the form of gum spirits and the non-volatile portion, consisting largely of the resin acids (modified materially by the heating process) is converted to rosin. The rosin is freed from the major part of the above-mentioned foreign matter (chips, bark, etc.,) by filtering in the molten state through a coarse wire screen overlaid with cotton batting (practiced in the United States) or through a fine wire screen without cotton (practiced abroad).

The undesirability of retaining the foreign matter throughout the distillation process has long been recognized and the belief that such foreign matter contributes materially in the way of soluble color bodies (visible or potential) and finely suspended matter that tend to degrade the rosin has long prevailed so that efforts have been made from time to time to develop means for treating the pine gum as such before distillation. Such preliminary gum treatment is to some extent practiced abroad (France and Spain) and generally includes an agitation of the gum with hot water, sometimes preceded by dilution with turpentine, allowing to settle while warm (which results in stratification), separating clear layers by decantation, and filtering other layers through wire screen.

This practice has but one object in view: That of removing the foreign matter. In no way does it cause a separation of gum into parts or fractions of different composition since the mass is all in the liquid state. It is not our purpose to go into all the various difficulties due to emulsions, extraction of soluble plant substances incident to the hot water treatment while the pine gum still contains chips, bark, etc., all of which factors tend to introduce soluble impurities (tannins and other plant extractives). This gum cleaning procedure, although practiced to a certain extent abroad, has apparently not proven satisfactory, and has found no application in this country.

As pointed out above, this practice in pine gum treatment has heretofore concerned only the pine gum as a whole and with but one object: That of producing rosin lighter in color and more nearly free from suspended matter. No pine gum treatment has heretofore been proposed which contemplates the production from the gum of fractions of different composition which are in turn productive of rosins with different properties, nor did any treatment heretofore proposed take into account differences in composition, for example, of the supernatant oily layer and the crystalline or "galipot mass", or of the various constituent parts of these, nor has any treatment taken advantage of the natural clarifying action resulting from the slow settling of the crystalline mass, a process which tends to drag down with it finely divided particles, colloidal materials, etc. Moreover, such difference in composition of the respective fractions of pine gum consists not only in gross differences in the relative proportions of acid and non-acid material, but in differences in the proportion of the different classes of primary acids contained in the respective gum fractions. These differences manifest themselves in subsequent differences in the properties of the resulting rosins from them.

Two classes of primary resin acids have been found to exist in pine gum (such as *P. maritime, P. pallustris, P. caribaea*, etc.), namely, the pimaric and the sapinic acids, the latter greatly predominating in quantity. The following general differences in properties characterize these two classes of acids: The pimaric acids (dextro and levo-pimaric) crystallize readily, the sapinic acids do not. The pimaric are much more stable than sapinic as regards oxidation and as regards isomerization and are less soluble than the latter. Similar differences in properties are to be noted in salts and soaps made from them.

When these acids are subjected to heat, as in the steam distillation for rosin and turpentine, the sapinic acids are more largely isomerized than the pimaric (one of the latter acids alpha or dextro pimaric being unaffected entirely) there being formed the "rosin" acids,—to some extent, the well known abietic acid.

In the process covered by our invention advantage is taken of such differences in composition of the pine gum fractions above mentioned, and of fractions obtained by recrystallization of the "galipot" mass in turpentine. Such fractional crystallization takes due account of the character and properties of the different primary acids contained in the pine gum, and their isomerization products, so that the proper precautions in the steps intended for the recrystallization of these acids may be exercised, and that the isomerizing action be held down to a minimum. The crystallizing properties of these acids are materially affected by the extent of admixture with their products of isomerization.

The clarifying effect and removal of potential color bodies from the various fractions is an integral part of our invention and, as pointed out above, is materially aided by the natural sweeping effect due to the agglomeration and settling of the crystals within the medium, the primary object of crystallization, however, being the production of fractions of different composition. The agglomerating effect of fine particles within the crystalline mass tends to produce filtrates of greater clarity and brilliance than that obtained by filtration of the molten rosin containing the foreign matter. The agglomerated or concentrated fine foreign matter, furthermore, is in such a condition that when these crystals are redissolved in warm turpentine and filtered they are apparently well retained by the layers of filter cloth, or other filtering medium.

As our process of crystallization can be carried out in turpentine spirits as a medium, no complications due to mixed solvents are introduced, and there arises no need for fractionation of the solvents.

Our process is not, however, restricted to the use of turpentine as a diluting or crystallizing medium, since, for purposes of producing these fractions other solvents, for example, alcohol, ether, acetone, etc., lend themselves readily and may be used, provided the economic disadvantages due to need for fractional distillations of the mixed solvents are offset by other advantages.

It may also be stated that any washing of pine gum fractions to free them from water-soluble matter in the process covered by our invention is not to be done while such gums or their fractions contain chips, bark, etc., but only after these have been removed by settling or filtration.

The extent of improvement in rosin grade possible by such fractionation may be such that rosins from some of the fractions may result having a color grade seven or more grades (French standard) above that of the whole gum, and in cases of high grade rosins normally yielding WW or X, rosin from some fractions may be 7 or more grades higher than X, viz. 7A French standard.

Our invention may be practiced with either high or low grade pine gums. Fractions productive of rosins with widely different properties as hereinafter described, in addition to possessing differences in color grade are procurable in either case when practicing our invention.

Such differences in properties include acid number, saponification number, ester number, unsaponifiable value, resene content, melting point, rotation, etc., as will be shown in greater detail in the particular examples hereinafter cited. As to whether or not such treatment is economically applicable to either kind of gum (high or low grade) is a matter that depends largely on price differential between low and high grade rosins, and to the extent to which such "special rosins" or rosins of special composition may find use in industry.

In any given pine gum the production of higher grade fractions is not necessarily accomplished at a sacrifice in grade to other fractions, when practicing our invention. Some gums yield no fraction lower in grade than the original gum, and the whole general grade level is raised, thereby, when our process is followed. The steps involved in practicing our invention are exceedingly simple, involving filtration, solution, and crystallization. A few precautions in these simple steps are nevertheless essential, which are more fully hereinafter set forth.

While the solvent or thinner used as a crystallizing medium is gum spirits, our process is not dependent solely upon that one solvent. We prefer the use of gum spirits as offering the most economic medium, since that eliminates the need for subsequent fractional distillation.

In the filtration of the pine gum, advantage is taken of the fact that the viscous or oil impregnated crystalline mass lends itself to vacuum filtration, because of the gentle but uniform pressure of the atmosphere much more readily than to mechanical (filter press) pressure methods. The latter is virtually unworkable because of the tendency of the crystalline mass to soften, clog the filter and materially reduce the yield of the crystalline mass ("galipot").

Centrifugal separation of the liquid from crystalline mass is inapplicable to gum.

We prefer to use a vacuum filtration arrangement in which the principal features are large filtration area per unit of gum, and the use of an arrangement in which the filter cloth rests on wire screen to permit free flow of the viscous filtrate. We have found that the various gums differ materially in their "filter-ability" owing to differences in properties of the crystalline mass (character and size of crystals), and of the saturated liquid medium (viscosity, etc.).

We prefer that preliminary small scale tests be made with each gum, in which the settled part of the gum is filtered directly, and when found to filter unsatisfactorily, it is thinned with about 1/7 of the volume of turpentine, before filtering. The part remaining on the filter cloth should be reasonably dry to the touch.

By referring to Example No. 4, it will be seen that the gum filtered very well.

EXAMPLE #4

*Treatment of gum (#9060—high grade) fractions and grades of their respective rosins*

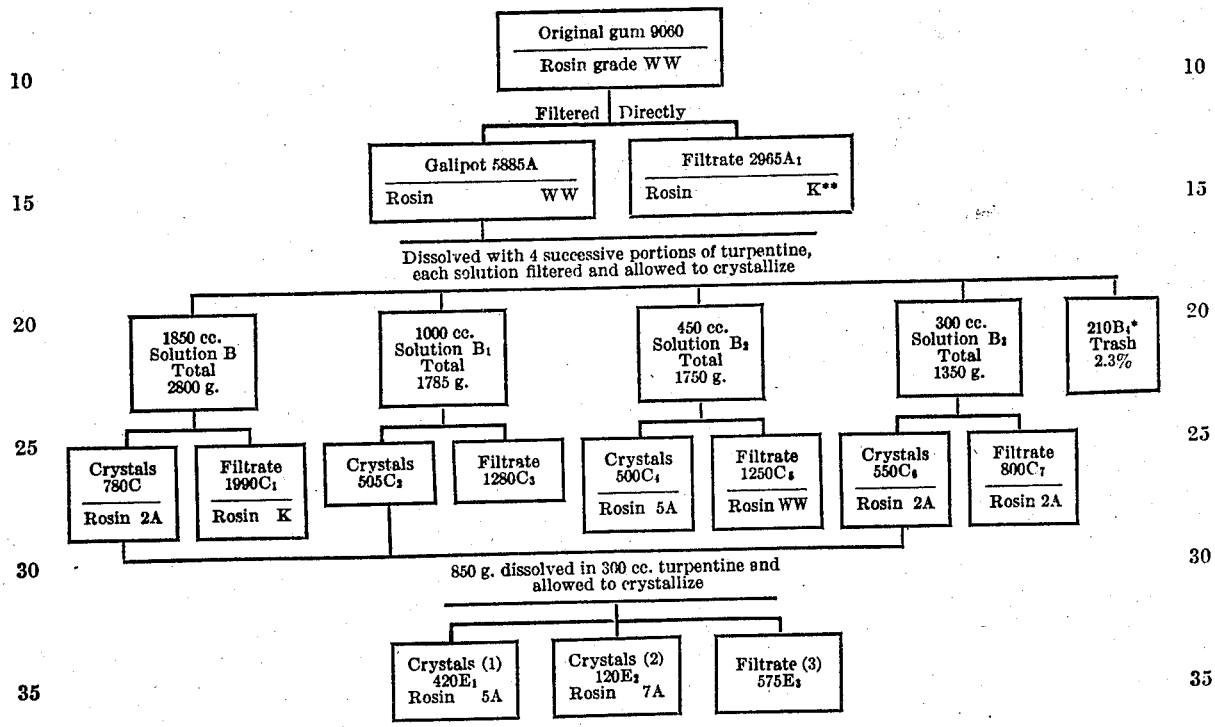

*Original gum contained 2.3% trash (chips, bark, etc.).
**This filtrate was found to have been contaminated by the apparatus. Repetition of experiment gave grade M.
Note: The numerical portion of the identifying numbers given, represent approximate weights of the original sample of gum, and the respective fractions thereof. This is also applicable to the hereinafter examples.

Whereas, by referring to Example #1, it will be observed that the gum used required thinning:

The filtrates, as a rule, yield small water layers on standing and in some gums (Example #1 and 2) become quite clear.

EXAMPLE #1

*Treatment of gum (#3690—high grade) fractions and grades of their respective rosins*

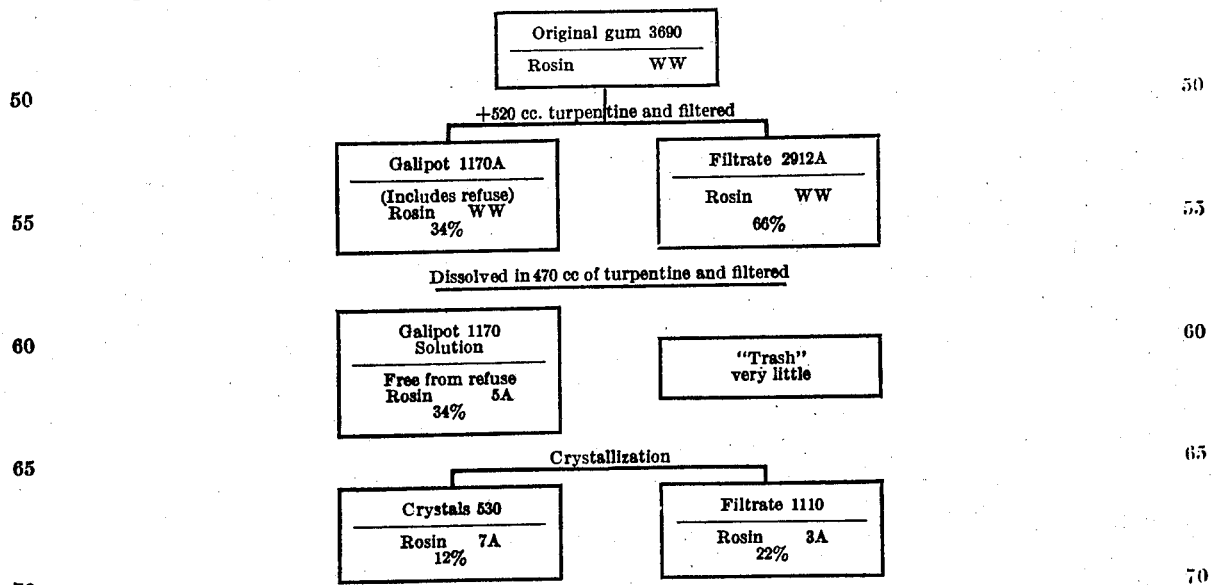

The solubility, or ease with which the "galipots" or crystalline crops are redissolved in turpentine, varies with the different samples of gum as may be seen by comparing the pertinent data under Example #1 with Example #2.

The solid portions of the filtered "galipot", which contains all of the chips, bark and suspended matter, is then taken up in turpentine (a ratio of about 3 volumes of gum to one of turpentine was generally sufficient), and solution effected by heating to about 70° C. as rapidly as possible. The resulting solution is filtered by suction through a double layer of filter cloth (overlaying the wire screen), and set aside for crystallization. The indicated precautions with regard to heating are necessary in order to effect solution with a minimum of isomerization of the unstable acids, as the partially isomerized acids have a marked deterrent effect on crystallization.

The crystalline mass resulting on standing is then filtered by suction, using cloth, wire screen, etc., as outlined above. Removal of the residual liquor from the crystalline mass is facilitated by washing with water, and then sucking more or less dry. The white crystalline mass is then either recrystallized from fresh turpentine, or steam distilled for the preparation of rosin. The steps taken with the respective examples being indicated diagrammatically in the aforementioned Examples 1 and 4 as well as by the following Examples 2 and 3:

EXAMPLE #2

*Treatment of gum (#1837—high grade) fractions, and grades of their respective rosins*

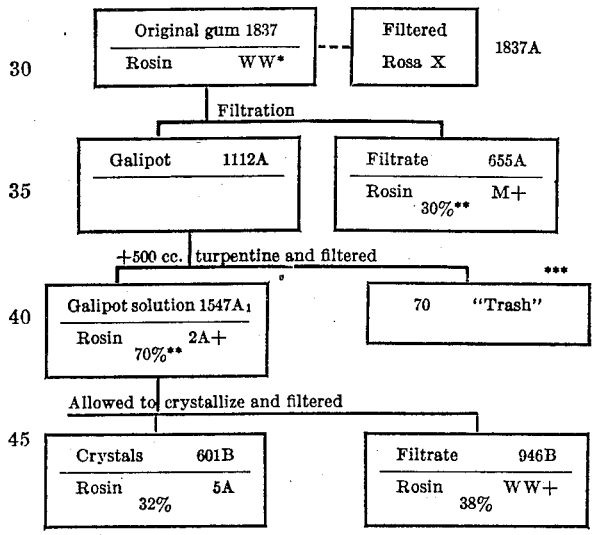

*A separate sample of the whole gum was dissolved in turpentine and filtered. The grade of the resulting rosin was WW near X.
**Rosin "%" for the several fractions ("galipot", "filtrate", "crystals") are expressed in terms of proportionate parts of the total rosin obtainable from the "original gum".
***"Trash" represents about 3.8% of the "original gum".

EXAMPLE #3

*Treatment of gum (#11360—low grade) fractions and grades of their respective rosins*

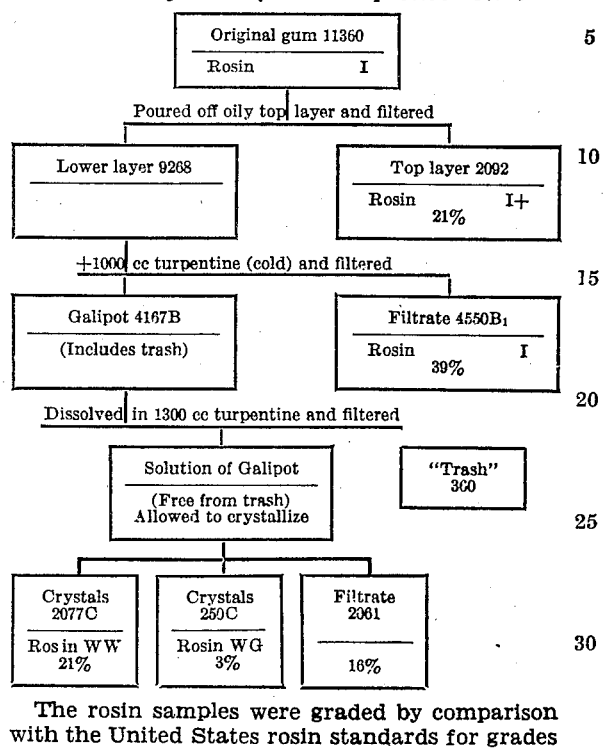

The rosin samples were graded by comparison with the United States rosin standards for grades up to X. For grades above X, samples were compared with "Lovibond" glass combinations equivalent to the French 2A, 3A, 5A, and 7A.

The properties of the rosins—acid number (A. N.), saponification number (S. N.), ester number (E. N.), and "unsaponifiable" (Uns.) were determined by the Walker "Ring and ball method", rotations $(\alpha)_D$ were determined in 95 per cent. alcoholic solution containing 5 grams of rosin per 100 cc. of solution.

The foregoing are four examples in which our process has been applied to gums of different quality. Details of the process just described are indicated in the diagrammatic float sheets for the respective gums used in the procedures. The properties of the rosins obtained from the respective fractions of two such gums cited in the examples are grouped in the following table:

TABLE 1

*Properties of rosins from gum fractions*

| Samples of gum and fractions | Per cent of original | A. N. | S. N. | E. N. | Unsap. | M. P. | $(\alpha)_D$ | Grade* |
|---|---|---|---|---|---|---|---|---|
| | | | | | Per cent | Degree C. | | |
| Gum #3690 (Fig. 1) Original #3690 | | 162.1 | 168.4 | 6.3 | 8.7 | 75.6 | +19.4 | WW+ |
| Galipot 1170A | | 171.5 | 174.5 | 3.0 | 4.8 | 82.8 | +6.9 | WW+ |
| Filtrate #2912A | 66 | 152.5 | 163.0 | 10.5 | 12.7 | 71.8 | +27.8 | WW |
| Recryst. #530B | 12 | 178.5 | 178.7 | 0.2 | 2.1 | 83.4 | +0.7 | 7A+ |
| 2nd filtrate #1110B | 22 | 169.7 | 173.0 | 3.3 | 5.9 | 78.2 | +27.8 | 3A |
| Gum #9060 (Fig. 4) Original #9060 | | 169.0 | 173.4 | 4.4 | 5.5 | 78.6 | −13.2 | WW |
| Galipot #5885A | | 173.0 | 174.1 | 1.1 | 4.0 | 80.1 | −24.3 | WW |
| Filtrate #2965A₁ | | 150.0 | 161.3 | 11.3 | 11.6 | 72.8 | +14.6 | K** |
| Crystals #780C | | 174.9 | 177.2 | 2.3 | 3.5 | 82.0 | +18.0 | 2A+ |
| Filtrate #1990C₁ | | 160.3 | 166.8 | 6.5 | 8.6 | 77.2 | +17.3 | K+ |
| Crystals #500C₄ | | 179.7 | 180.0 | 0.3 | 1.8 | 83.7 | −2.1 | 5A |
| Filtrate #1250C₅ | | 169.7 | 173.0 | 3.3 | 5.2 | 76.6 | −4.5 | WW+ |
| Crystals #550C₆ | | 180.2 | 179.8 | | 1.4 | 84.0 | 0.0 | 2A |
| Filtrate, #800C₇ | | 175.3 | 175.0 | | 2.8 | 83.4 | +9.7 | 2A |
| Rerecryst. #420E₁ | | 179.2 | 179.1 | | 2.0 | 82.8 | −10.4 | 5A+ |
| Rerecryst. #120E₂ | | 180.3 | 179.7 | | 1.3 | 83.2 | −20.8 | 7A |

* U. S. rosin Standards for grades up to "X". French standards (equivalent in "Lovibond" glass) for grades above "X".
** Filtrate found to have been contaminated by apparatus.

The following general conclusion may be drawn regarding the characteristic differences in properties of the respective fractions, obtained by practicing our invention.

As may be seen from these data, rosins with marked differences in content of total acid and comparable differences in unsaponifiable matter, are thus obtained from the different fractions, some almost wholly acid in nature, with as little as 1.3 per cent, unsaponifiable matter ($120E_2$), and with so little color content as to grade considerably above the highest standard of American grading.

As may be further seen from the data, filtrates generally speaking, show consistently higher content of resenes, esters and color bodies than the corresponding "galipot" or crystalline portions and conversely the latter show consistently higher content of acid, and greater freedom from color.

Thus, from the foregoing data there is indicated a very simple process for the artificial control of these essential properties in rosin.

One rather striking feature regarding the grade or color content of the rosin from the respective gum fractions produced by our process may be pointed out, namely, that in some instances (gums cited in Examples 2 and 3), none of the fractions fall below (in grade) that of the original untreated gum, and that the general grade level of the fractions as a whole is raised considerably.

Having thus described our invention, what we claim for Letters Patent is:

We claim:

1. A method for separating pine gum into fractions that differ in composition and color, which comprises subjecting unheated, undiluted, and otherwise unaltered pine gum to the action of vacuum filtration, thereby preserving and retaining the acids in the crystalline mass remaining on the filter in their original state; then dissolving said mass in turpentine at a temperature which will not cause the acids to isomerize; then removing the extraneous impurities therefrom, and allowing the said solution to cool and crystallize, thereby effecting a recrystallization of said mass and producing a series of liquid and solid fractions, which differ one from another in composition and color content; repeating this process of recrystallization until the resulting fractions have, respectively, the desired compositions, colors, and other properties.

2. A process for producing rosin-like products in grade considerably above the highest on the American scale and rosin-like products of special composition from pine gum, which, by ordinary processing, is productive of normal rosins of considerably lower grade, which comprises subjecting unheated, undiluted, and otherwise unaltered pine gum to the action of vacuum filtration, thereby preserving and retaining the acids in the crystalline mass remaining on the filter in their original state; then dissolving said mass in turpentine at a temperature which will not cause the acids to isomerize; then removing the extraneous impurities therefrom, and allowing the said solution to cool and crystallize, thereby effecting a recrystallization of said mass and producing a series of liquid and solid fractions which differ one from another in composition and color content; repeating this process of recrystallization and then subjecting the colorless fractions to the usual steam distillation process.

SAMUEL PALKIN.
THOMAS H. HARRIS, Jr.